Figure 1:
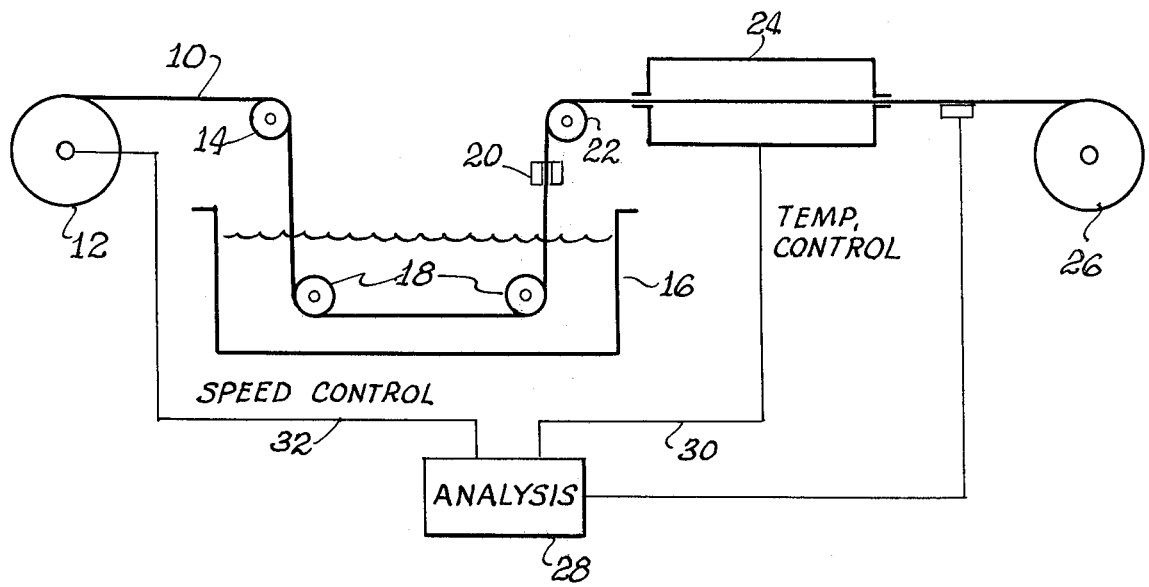

United States Patent
Rosinski et al.

[11] 3,900,584
[45] Aug. 19, 1975

[54] METHOD FOR ANALYSIS OF TREATED GLASS FIBERS

[75] Inventors: Klaus D. Rosinski, Granville; John W. Schroer, Newark, both of Ohio

[73] Assignee: Owens-Corning Fiberglas Corporation, Toledo, Ohio

[22] Filed: Nov. 13, 1972

[21] Appl. No.: 306,267

[52] U.S. Cl. ............. 427/8; 23/230 A; 23/230 PC; 427/175
[51] Int. Cl. ...................... C03c 25/02; G01n 31/12
[58] Field of Search .......... 117/126 GB, 66, DIG. 2, 117/63, 4; 23/230 M, 230 R, 230 A

[56] References Cited
UNITED STATES PATENTS

| | | | |
|---|---|---|---|
| 3,383,350 | 5/1968 | Pettyjohn | 23/230 |
| 3,679,457 | 7/1972 | Gordon | 117/66 |
| 3,730,759 | 5/1973 | Marzocchi | 117/126 GB |
| 3,765,927 | 10/1973 | Marzocchi | 117/126 GB |

OTHER PUBLICATIONS
Unit Operations of Chemical Engineering, McCabe and Smith, Pages 707, 902, 903, McGraw–Hill, 1956.

*Primary Examiner*—William D. Martin
*Assistant Examiner*—Stuart D. Frenkel
*Attorney, Agent, or Firm*—Carl G. Staelin; John W. Overman; Keith V. Rockey

[57] ABSTRACT

A method for determining the degree of cure of glass fibers coated with a heat-cured polymeric material wherein the coated glass fibers are contacted with water at an elevated temperature for a time sufficient to extract water-soluble carbon material from the heat-cured polymeric material, and the resulting extract is subjected to analysis to determine the carbon content of the extract. It has been found that the carbon content of the aqueous extract is inversely proportional to the degree of cure of the polymeric material.

9 Claims, 2 Drawing Figures

METHOD FOR ANALYSIS OF TREATED GLASS FIBERS

This invention relates to the manufacture of glass fiber-reinforced products such as glass fiber-reinforced elastomeric and plastic products, and more particularly to an improved method for the treatment of glass fibers for use in such products.

The term "glass fibers", as used herein, is intended to refer to and include (1) continuous fibers formed by rapid attenuation of hundreds of streams of molten glass and to strands formed when such continuous glass fiber filaments are gathered together as they are being formed; and to yarns and cords formed by plying and/or twisting a number of strands together, and to woven and non-woven fabrics which are formed of such glass fiber strands, yarns or cords, and (2) discontinuous fibers formed by high pressure steam, air or other suitable attenuating force directed onto multiple streams of molten glass issuing from a glass melting bushing or from an orifice containing spinner, and to yarns that are formed when such discontinuous fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and terpolymers thereof with styrene and acrylonitriles, styrene and vinyl pyridine; and EPDM rubbers as represented by butadiene polymers and copolymers with monoolefins such as butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3 to 20 carbon atoms, such as propylene, and polyene, such as dicyclopentadiene, 1,4-hexadiene and preferably an alkylene or alkylidene norbornene, such as 5-alkylidene-2-norbornene and the like in which the alkylidene group numbers from 2 to 12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature, thereby resulting in the formation of a thin but tenacious film of water on the glass fiber surfaces which serves to destroy any bond, chemical or physical, which would otherwise be formed between the glass fiber surfaces and the elastomeric material with which the glass fibers are combined.

To minimize the problems of bonding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords, chopped strands or fabrics, hereinafter referred to as bundles, containing an impregnant therein which also serves to intertie the glass fiber bundles to the elastomeric material in which the bundles are distributed.

Numerous impregnants are now known to those skilled in the art, and most such impregnants are formulated to include an elastomer component. For example, use has been made of a blend or combination of a resorcinol-aldehyde resin and an elastomer such as natural rubber latex for the treatment of glass fiber bundles to effect impregnation of the bundles.

Another suitable composition for use in the impregnation of bundles of glass fibers is disclosed in U.S. Pat. No. 3,424,608, in which description is made of a composition formulated to include a resorcinol-aldehyde resin, a vinyl pyridine-styrene-butadiene terpolymer, neoprene rubber and butadiene rubber.

In U.S. Pat. No. 3,567,671, description is made of a tack free impregnant composition for use in the impregnation of bundles of glass fibers which is formulated to include a resorcinol-aldehyde resin, a vinyl pyridine-butadiene-styrene terpolymer, an acrylic polymer, a carboxylated butadiene-styrene copolymer or a copolymer of vinyl chloride and vinylidene chloride and an incompatible wax. It has been subsequently found that the adhesion characteristics of bundles of fibers impregnated with an impregnant can be improved by using, instead of a monocarboxylated butadiene-styrene copolymer, a dicarboxylated butadiene-styrene copolymer in the impregnating composition.

It is generally the practice, in the treatment of glass fibers in the form of bundles by impregnation, to pass a bundle of glass fibers, in which the fibers forming the bundle preferably but not necessarily have a thin size coating containing an anchoring agent such as an organo silicon compound or a Werner complex compound on the individual surfaces thereof, through an impregnating bath containing an aqueous dispersion or latex of the impregnating composition whereby the solids of impregnating composition serve to penetrate the bundle to substantially fill the interstices between the individual fiber filaments. The impregnated bundle is then raised from the bath for passage through a drying oven, preferably in the form of a hot air oven, a radiant oven, a dielectric oven or the like in which the aqueous diluent is removed and the impregnant is cured. Such ovens are frequently maintained at temperatures sufficient to heat the bundle to within the range of 300° to 650°F., and preferably 325° to 500°F., depending somewhat on the nature of the impregnant.

It has been found, however, that it is difficult to accurately control the degree of cure to which the impregnated bundles are subjected. The degree of cure depends upon the temperature of the oven, and on the linear speed of the impregnated bundle as the bundle passes through the oven. If the impregnated bundle is undercured, the bundle will contain relatively large quantities of lower molecular weight polymeric materials and consequently have inferior tensile strength and adhesion characteristics. If, on the other hand, the impregnated bundle is overcured, the bundle becomes hard and suffers a loss of adhesion characteristics, and consequently is less suitable for reinforcement of elastomeric materials in the manufacture of glass fiber-reinforced elastomeric products.

It is accordingly an object of this invention to provide a method for the treatment of glass fibers with a polymeric material for use in the manufacture of glass fiber reinforced elastomeric products.

It is a more specific object of the invention to provide a method for the treatment of glass fibers with a polymeric material to form a coating on the glass fibers in which the extent of cure of the polymeric material in the coating can be measured efficiently and economically on an industrial scale, and the cure of the coating can be adjusted in response to such measurements.

Figure 2:
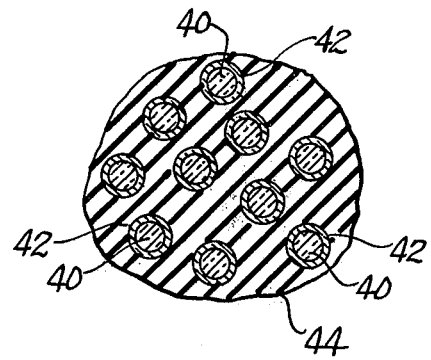

These and other objects and advantages of the invention will appear more fully hereinafter, and, for purposes of illustration but not of limitation, an embodiment of the invention is shown in the accompanying drawing in which:

FIG. 1 is schematic diagram showing the treatment of glass fiber bundles in accordance with the preferred practice of the invention; and, FIG. 2 is a cross-sectional view of a bundle which has been treated in accordance with the method illustrated in FIG. 1.

The concepts of the present invention reside in a method for monitoring the extent of cure of a coating of a polymeric material on glass fibers in which a sample of the coated glass fibers is subjected to an extraction operation with water to dissolve a portion of the polymeric material in the water. It has been unexpectedly found that the degree of cure is inversely proportional to the carbon content of the aqueous extract.

In the preferred practice of this invention, the carbon content is measured by oxidizing the carbon contained in the extract to $CO_2$ and recording the amount of $CO_2$. The measurements thus obtained can be used to adjust the temperature at which the coating on the glass fibers is cured and/or the residence time of the coated glass fibers in the curing oven or the like to thereby control the curing operation within narrowly defined limits.

The method of the invention is particularly well suited for use in the continuous or semicontinuous production of impregnated glass fiber bundles for use in the reinforcement of glass fiber reinforced elastomeric products such as rubber tires, drive belts, timing belts, etc. Referring now to FIG. 1 of the drawings, there is shown a diagrammatic illustration of a conventional impregnation operation employing the analytical method of this invention.

A bundle 10 of glass fibers, in which the individual glass fiber filaments preferably have a thin size coating thereon, are advanced from, for example, a storage drum 12 over a guide roller 14 for passage downwardly into a bath 16 containing an aqueous dispersion or latex of the impregnating composition. The bundle is then turned under a pair of longitudinally spaced rollers 18 submerged in the bath 16 to effect a sharp bend which operates to open the bundle to enable more complete penetration of the aqueous impregnating composition into the bundle of fibers to facilitate complete impregnation of the bundle. The impregnated bundle is then raised from the bath for passage through a roller or die 20 which operates to remove excess impregnating composition from the bundle and to wisk the impregnating composition into the interstices between the fibers forming the bundle.

Thereafter, the endless bundle is advanced over a roller 22 for passage through an elongated drying and curing oven 24 in which the bundle is dried to remove aqueous diluent and to cure the polymeric material contained in the impregnant. As previously pointed out, such drying and curing operations are usually carried out by heating the bundles to temperatures of 300° to 650°F. and preferably 325° to 500°F. The drying and curing operation is most frequently carried out at higher speeds of the bundle through the oven; speeds of 250 to 600 feet per minute are usually employed to give a residence of the bundle in the oven ranging from 0.1 to 60 minutes. The actual degree of cure of course depends not only on the residence time but also on the oven temperature.

In the practice of this invention, samples of the impregnated bundles are subjected to an extraction operation, using water at an elevated temperature, either continuously or intermittently as desired. It is preferred to cut the impregnated bundle into short lengths (e.g. from 0.25 to 5 inches) and then contact the cut bundles with hot water for a period of 5 minutes to 1 hour or longer. The temperature of the extraction operation is not critical; it has been found that with higher water temperatures, lower extraction times can be used. For this reason, it is preferred to employ water at a temperature from 150° to 212°F., with boiling water being most frequently employed. The foregoing extraction conditions are not critical to the practice of the invention; it is important, however, that the same extraction conditions be employed when seeking to compare one measurement with another.

The aqueous extract which is obtained contains organic carbon material which is soluble in water; the nature of this soluble carbon material is not known at the present time, but it is known that the soluble carbon material is dissolved from the coating of the polymeric material. The amount of carbon contained in the soluble carbon material is indirectly proportional to the degree of cure. In other words, a high carbon content in the aqueous extract is indicative of a low degree of cure, and a low carbon content in the aqueous extract is indicative of a high degree of cure, of the polymeric material forming the coating on the glass fibers.

In the preferred practice of the invention, the carbon content of the aqueous extract is measured by oxidizing the soluble carbon material contained in the aqueous extract to carbon dioxide and then determining the amuont of carbon present as $CO_2$. This analysis is preferably, in industrial applications, instrumentally. It has been found that good results are obtained where the analysis is performed with a Beckman Total Organic Carbon Analyzer, Model 915, which is commercially available from Beckman Instruments. This instrument oxidizes the carbon material to $CO_2$ and then measures the amount of $CO_2$ produced.

As will be appreciated by those skilled in the art, other analytical instruments and techniques which measure the carbon content of the aqueous extract may be used as desired. It has been found that more accurate and reproducible results are obtained where the analysis is performed by oxidation of the carbon content of the aqueous extract and then measuring the $CO_2$ produced.

The analysis of the present invention provides extremely reliable feedback data for control of the speed at which the coated fibers are passed through the curing oven, and thus the residence time of the coated fibers in the oven and/or the oven temperature. In one preferred embodiment of the invention, the carbon content of the aqueous extract as a measure of the degree of cure can be used on an intermittent or continuous basis to adjust the oven temperature and/or the residence time of the coated glass fibers in the oven to insure optimum cure during processing and provide treated glass fibers having more uniform physical and chemical properties.

Referring to the schematic diagram of FIG. 1, the treated glass fibers emerging from the oven 24 can be intermittently or continuously sampled and the resulting samples subjected to analysis by a carbon analyzer shown diagrammatically as 28. The output of the analyzer 28 can then be used to control the oven temperature by way of feedback 30 and/or the speed of the supply reel 12 and/or the speed of the take-up reel 26 by way of feedback 32. Thus, where the samples of treated glass fibers emerge from the oven under-cured, the feedback can be used to increase the oven temperature and/or decrease the speed of the treated glass fibers through the oven; when the samples are oven-cured, the feedback can be used to reduce the oven temperature and/or increase the speed at which the treated glass fibers are passed through the oven.

The impregnated bundle prepared by the process illustrated in FIG. 1 is shown in cross-section in FIG. 2 of the drawing. As can be seen from this figure, the individual glass fibers 40 having a thin coating 42 thereon, with the coating being formed from a conventional size composition of the type described above. The impregnant 44 is substantially uniformly distributed throughout the bundle to fill the interstices between the sized fibers to provide a unitary bundle structure.

The method of this invention is ideally suited and preferred for use in the manufacture of impregnated bundles of glass fibers. The bundles are frequently in the form of a plurality of strands of glass fibers which are plied and/or twisted together to form cords. A number of impregnating compositions can be used as the coating composition; such compositions generally contain an elastomer or rubber, and preferably an elastomer blended with a resorcinol-aldehyde resin, in the form of an aqueous latex. Suitable impregnating compositions are described in U.S. Pat. Nos. 3,391,052, 3,402,064, 3,413,186, 3,124,608, 3,509,012, 3,567,671 and numerous others.

However, the concepts of this invention are likewise applicable to the coating of individual glass fiber filaments with such polymeric material, and to the coating of glass fibers and the impregnation of glass fiber bundles with other heat-curable polymeric compositions, such as in the coating of fibers, yarns, etc. with sizes or binders. The chemical composition of the coating material is not critical so long as the coating includes a heat-curable polymeric material containing carbon.

Having described the basic concepts of the invention, reference is now made to the following examples which are provided by way of illustration but not of limitation, of the practice of the invention.

EXAMPLE 1

This example illustrates the method of the present invention using the impregnating composition described in copending application Ser. No. 230,723 filed Apr. 24, 1972.

Using the procedure described in the above application, an impregnating composition is formulated as follows:

| | Parts by weight |
|---|---|
| Resorcinol-formaldehyde resin (Penacolyte R 2170 — Koppers Company) | 4.0 |
| Vinyl pyridine-butadiene-styrene terpolymer (Gentac FS — General Tire and Rubber Co.) | 30.0 |
| Dicarboxylated butadiene-styrene resin (Pliolite 4121 — Goodyear) | 20.0 |
| Microcrystalline paraffin wax (Vultex wax emulsion — General Latex and Chemical Corp.) | 6.0 |

Water constitutes the balance of the composition, and the amount of water is adjusted to provide a latex having a total solids content within the range of 10 to 40% solids by weight.

Bundles of previously sized glass fibers are then passed through the impregnating bath 16 and are impregnated in accordance with the flow diagram of FIG. 1. Five impregnated bundles which emerged from the oven 24 were sampled for various runs at different line speeds and oven temperatures. Each of the samples were cut into 1-inch lengths, and 600 inches of each sample were placed in 100 ml of water.

The samples in the water were boiled at 212°F for 15 minutes to extract the soluble carbon material from the impregnated bundles. A portion of the aqueous extract for each sample is placed in a Model 915 Beckman Total Carbon Analyzer and the carbon content of the extract is determined by comparing the response of the analyzer to that for standard samples prepared by dissolving potassium acid phthalate in water.

The results of these tests are shown in the following table.

Table 1

| | Sample | Line Speed (ft/min) | Oven Temp. (°F) | Carbon Conc. (ug/ml) |
|---|---|---|---|---|
| Bundle A | 1 | 425 | 585 | 82.2 |
| | 2 | 400 | 585 | 75.5 |
| | 3 | 375 | 585 | 71.2 |
| | 4 | 350 | 585 | 64.7 |
| | 5 | 325 | 585 | 58.5 |
| Bundle B | 6 | 350 | 550 | 53.0 |
| | 7 | 375 | 550 | 60.2 |
| | 8 | 400 | 550 | 65.0 |
| | 9 | 425 | 550 | 73.7 |
| | 10 | 450 | 550 | 75.8 |
| | 11 | 475 | 550 | 84.0 |
| | 12 | 500 | 550 | 90.7 |
| Bundle C | 13 | 325 | 540 | 65.6 |
| | 14 | 350 | 540 | 70.5 |
| | 15 | 375 | 540 | 77.5 |
| | 16 | 400 | 540 | 84.5 |
| | 17 | 425 | 540 | 90.5 |
| Bundle D | 18 | 325 | 540 | 39.8 |
| | 19 | 350 | 540 | 51.0 |
| | 20 | 375 | 540 | 55.0 |
| | 21 | 400 | 540 | 66.7 |
| | 22 | 425 | 540 | 68.4 |
| | 23 | 375 | 530 | 58.2 |
| | 24 | 375 | 540 | 53.7 |
| | 25 | 375 | 550 | 50.0 |
| Bundle E | 26 | 375 | 560 | 48.0 |
| | 27 | 375 | 570 | 45.0 |
| | 28 | 375 | 580 | 43.8 |
| | 29 | 375 | 590 | 42.5 |

The foregoing data reveals that the carbon content of the aqueous extract increases with an increase in the line speed, i.e. the speed at which the bundles are passed through the oven for a given oven temperature.

The data also show that the carbon content of the aqueous extract decreases with increasing oven temperatures, and thus the degree of cure is inversely proportional to the carbon content of the extract.

EXAMPLE 2

This example illustrates the use of an impregnating composition of the type shown in U.S. Pat. No. 3,567,671.

Using the procedure described in the above patent, an impregnating composition is formulated as follows:

| | Parts by weight |
|---|---|
| Resorcinol-formaldehyde resin | 6.0 |
| Vinyl pyridine-butadiene-styrene terpolymer | 35.0 |
| Vinyl chloride-vinylidene chloride copolymer resin | 20.0 |
| Microcrystalline paraffin wax | 6.0 |
| Water to solids content of 30% by weight | |

A bundle of sized fibers is impregnated with the foregoing composition in accordance with the procedure illustrated in FIG. 1 of the drawing. The bundle emerging from the oven is sampled, and the samples are subjected to analysis with a Model 915 analyzer using the same procedure as described in Example 1.

Analysis of bundles processed at varying line speeds and oven temperatures show results comparable to those obtained in Example 1. It is found that a definite difference in the carbon content of the aqueous extract is obtained for runs differing in oven temperature of 10°F or line speeds differing in 25 feet per minute.

EXAMPLE 3

This example illustrates the use of another impregnating composition of the type described in U.S. Pat. No. 3,567,671.

Using the procedure described in the foregoing patent, an impregnating composition is formulated as follows:

| | Parts by weight |
|---|---|
| Resorcinol-formaldehyde resin | 4.0 |
| Vinyl pyridine-butadiene-styrene terpolymer | 30.0 |
| Monocarboxylated butadiene-styrene resin | 20.0 |
| Microcrystalline paraffin wax | 5.0 |
| Water to solids content of 31% | |

Impregnation is effected with the foregoing composition using the procedure illustrated in FIG. 1 to deposit in a glass fiber bundle dry solids constituting from 10 to 35% by weight, and preferably 15 to 25% by weight, of the glass fiber system. Samples of the bundles thus produced are cut into lengths of 1 inch and extracted with boiling water. The extracts are then subjected to analysis as described in Example 1 to determine the carbon content of the extract. Comparable results are obtained.

EXAMPLE 4

An impregnating composition is formulated as follows:

| | Parts by weight |
|---|---|
| Resorcinol-formaldehyde resin | 20.0 |
| Natural rubber latex | 80.0 |
| Water to solids content of 35% | |

Bundles of glass fibers are impregnated with the foregoing composition, and samples of the bundles are subjected to analysis by extraction with hot water at 190°F for 30 minutes and measurement of the carbon content of the aqueous extract. Comparable results are obtained.

EXAMPLE 5

Using the procedure of Example 1, a latex of neoprene rubber having a solids content of 25% by weight is used in the impregnation of glass fiber bundles. The bundles are then sampled and the samples are subjected to extraction with boiling water. Carbon analysis reveals that the degree of cure is inversely proportional to the carbon content of the extract.

It will be apparent from the foregoing that we have provided an improved method for determining the extent of cure of glass fibers which have been coated with an organic heat-curable polymer. The method of the invention is particularly well suited for use in the analysis of bundles of glass fibers which have been impregnated with a heat-curable impregnant for use in the manufacture of glass fiber reinforced elastomeric products to maintain uniformity in the degree of cure and thereby provide impregnated bundles having uniform properties.

It will be understood that various changes and modifications can be made in the details of procedure, formulation and use without departing from the spirit of the invention, especially as defined in the following claims.

We claim:

1. In a method for the treatment of glass fibers wherein the glass fibers are coated with a heat-curable polymeric material containing, when cured, water-soluble carbon material and the coated glass fibers are passed through an oven and heated to an elevated temperature at high speed to cure the polymeric material, the improvement comprising selecting a sample of the coated glass fibers having a cured coating, contacting the sample with water at an elevated temperature for a time sufficient to extract the water-soluble carbon material from the cured coating, determining the carbon content of the resulting extract as a measure of the degree of cure of the coating and adjusting at least one of (1) the temperature to which the coated fibers are heated and (2) the speed, in response to the carbon content of the aqueous extract whereby at least one of (1) the temperature to which the coated glass fibers are heated is increased and (2) the speed of the coated fibers through the oven is decreased, to increase the degree of cure or at least one of (1) the temperature to which the coated glass fibers are heated is decreased and (2) the speed of the coated fibers is increased, to decrease the rate of cure.

2. In a method as defined in claim 1 wherein the polymeric material includes an elastomer.

3. In a method as defined in claim 1 wherein the polymeric material includes a blend of a resorcinol-aldehyde resin and an elastomer.

4. In a method as defined in claim 1 which includes the step of cutting the coated glass fibers to short lengths for contact with the water.

5. In a method as defined in claim 1 wherein the coated glass fibers are contacted with water maintained at a temperature within the range of 150° to 212°F.

6. In a method as defined in claim 1 wherein the coated glass fibers are contacted with boiling water.

7. In a method as defined in claim 1 wherein the carbon content of the aqueous extract is determined by oxidizing the soluble carbon content of the aqueous extract and measuring the amount of $CO_2$ produced.

8. In a method as defined in claim 1 wherein the coating is effected by immersing a bundle of glass fibers in an aqueous bath of the polymeric material and then subjecting the bundle to a sharp bend to open the bundle to facilitate penetration of the polymeric material into the bundle.

9. In a method for the treatment of glass fibers wherein the glass fibers are coated with a heat-curable polymeric material containing, when cured, water-soluble carbon material and the coated glass fibers are passed through an oven and heated to an elevated temperature at high speed to cure the polymeric material, the improvement comprising selecting a sample of the coated glass fibers having a cured coating, contacting the sample with water at an elevated temperature for a time sufficient to extract the water-soluble carbon material for the cured coating to form an aqueous extract, oxidizing the soluble carbon content of the aqueous extract, measuring the amount of carbon dioxde produced to determine the degree of cure of the coating, and adjusting at least one of (1) the temperature to which the coated fibers are heated and (2) the speed, in response to the carbon content of the aqueous extract whereby at least one of (1) the temperature to which the coated glass fibers are heated is increased and (2) the speed of the coated fibers through the oven is decreased, to increase the degree of cure or at least one of (1) the temperature to which the coated glass fibers are heated is decreased and (2) the speed of the coated fibers is increased, to decrease the rate of cure.

* * * * *